United States Patent Office 3,162,569
Patented Dec. 22, 1964

3,162,569
METHOD OF SELECTIVELY DESTROYING PARASITE-CARRYING MOLLUSKS AND THE LIKE
Sébastien Pastac, 27 Rue Rieussec, Viroflay, France
No Drawing. Filed May 11, 1962, Ser. No. 194,166
16 Claims. (Cl. 167—16)

My present invention relates to a parasiticide and a method of employing same to destroy mollusks, snails and similar aquatic parasites able to affect animal life or damage the plants.

It is well known that, particularly in the tropics, certain snails and other mollusks are able to infect the human and animal populations. These parasites occur commonly throughout the tropics in rivers and other bodies of water and are carriers of bilharziasis, a disease affecting a substantial part of the warmblooded population. While parasiticides adapted to kill such mollusks are well known and may include for example barium chlorides, copper sulfates and pentachlorophenates soluble in water, the use of these materials adversely affects the odor, color and taste of the water in which they are introduced. Moreover, it is important that the parasiticide chosen should not affect the flora and fauna inhabiting these bodies of water upon which the surrounding human population is often dependent as a source of food. Thus, the mollusk-killing additive or molluscicide must not endanger the fish and bird life dependent upon these water bodies for their nutriment.

It is therefore an object of the present invention to provide an improved pesticidal agent adapted to eliminate infectious mollusks and gastropods but nontoxic to the plant, human or animal population, along with a simple method of employing such agent.

It has been found, in accordance with the present invention, that water-insoluble copper protoxide ($Cu_2O$) is, surprisingly, a highly effective and selective mollusk-killing agent when dispersed in a concentration in the order of parts by weight per million in the bodies of water inhabited by these parasite carriers.

In contradistinction to known mollusk-killing agents, which must be dissolved in water, cuprous oxide ($Cu_2O$) is dispersed in the aqueous medium containing mollusks, which are carriers of bilharziasis (e.g., *Bulinus contortus, Physopsis africana, Biomphalaria glabratus, B. boissyi* and similar blood-fluke-carrying snails), with a minimum of solubilization, so that the flora and fauna of the body of water are not adversely affected. I have found that most effective results are obtained when the copper protoxide is formed in situ (i.e., in the medium) by the decomposition of a complex copper salt of a copper sulfite which is introduced into the body of water to be protected in an amount sufficient to generate a gastropodic quantity of the cuprous oxide. Such salts include Chevreul's salt $Cu[Cu_2(SO_3)_4(H_2O)_2]$, and Pean's salt $Cu[Cu_2(SO_3)_4(H_2O)_4]$ and Etard's salt, the latter being a further hydrated variant of the other two. Advantageously, Chevreul's salt or one of the others previously mentioned is introduced into boiling water, preferably in the presence of a reducing agent and under somewhat alkaline conditions to provide a preparation highly effective in the destruction of mollusks capable of carrying the bilharziasis- and schistosomiasis-causing parasites. The salts, upon decomposition, produce cuprous oxide and sulfur dioxide and are compatible with many of the salts and oxides present in the water (e.g., magnesium, zinc, cadmium, cobalt and nickel salts) and do not form with these salts or oxides substances toxic to the fishlife therein.

While reducing substances are not required to render the salts effective, they assist in preventing the formation of divalent copper salts of the type normally employed for fungicidal purposes. Thus, the development of soluble cupric salts (e.g., copper nitrate, sulfate, chloride and acetate) is effectively limited. As a reducing substance to be employed in conjunction with the salts whose decomposition leads to the formation of cuprous oxide, I prefer to use basic sulfites and nitrogen compounds as well as readily oxidizable organic materials. Thus, reducing agents effective for this purpose include hydrosulfites, alkaline sulfites and bisulfites, the sulfite residues of paper productions (e.g., lignosulfites), hydrazine and members of the hydrazine family (e.g., phenylhydrazines and hydroxylamines), dextrin and reducing sugars as well as their derivatives, organic salts such as oxalates, benzoates and gallates, chloral and glycerine. In each case, a pH greater than 7 increases the rate of decomposition of the salt and, consequently, the rate at which the cuprous oxide is dispersed in the body of water. With certain of the reducing agents, i.e., hydrazine and some sulfites, an alkaline additive is not required since the reducing agents have sufficient alkalinity to raise the pH to a suitable level.

I have also found that it is desirable to admix with the decomposable salt a dispersing agent adapted to stabilize cuprous oxide products formed upon decomposition of Chevreul's salt. I also may admix with the active salt a bait attractive to the mollusks. Such baits include cereals such as rice and edible wastes (e.g., bacon rind).

The complex copper salt of hydrated copper sulfite may be stored in the form of a paste which is readily dispersible in the water. To prevent oxidation, I have found it advisable to include within the paste, reducing agents or agents oxidizable in preference to the active salt or to blanket the latter with a reducing of inert atmosphere (e.g., nitrogen). Consequently, I combine the active salt with one or more of the above-mentioned reducing agents or an aromatic (phenolic) substance susceptible to oxidation in preference to the salt. The admixture may also include a glutinous material lending at least a limited coherence to the particles of the salt.

It has been found that the alkaline and reducing treatment of Chevreul's salt and like compositions results in a decomposition of the latter and the precipitation of a compound conforming generally to the formula

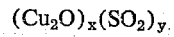

$$(Cu_2O)_x(SO_2)_y$$

When $x$ equals 1, $y$ has been found to have values ranging between 1 and 0. The precipitate may be hydrated or not, depending upon the conditions of the decomposition of the active salt. Under the conditions prevalent in the natural bodies of water in which the use of an active salt of this type is particularly suitable, the precipitate decomposes further to cuprous oxide with a release of $SO_2$, the cuprous oxide, otherwise known as copper protoxide, being thoroughly dispersed in the water. All of the active salts previously described have essentially the same decomposition products, are insoluble in water, and have approximately the same strong action as molluscicides.

According to another aspect of the invention the active salt may be admixed with stabilizing substances preferably adapted to envelop the salt and exclude ambient oxygen from contact therewith. These oxidation-inhibiting materials are, advantageously, water soluble so as to release the active agent upon introduction of the admixture into a body of water. Suitable additives of this type include gelatinizing and solidifying materials adapted to produce a solid or semi-solid preparation which is convenient to handle and has a long shelf life. The stabilizer may comprise a water-soluble glue, gelatine or the like. The activity of the complex copper salt may be markedly increased by admixing therewith cryptophenols and wetting agents designed to permit intimate contact of water with the active salt. The dispersion of the preparation in the body of water is accelerated by admixtures such as highly comminuted silica and chalk ($CaCO_3$).

Since most mollusks generally frequent the bottom of a body of water, I provide a relatively dense carrier for the active salt capable of carrying the latter toward the bottom. A relatively light carrier, whose density is less than that of water, may also be employed to suspend a portion of the active salt in the upper regions of the body in order to destroy mollusks which rise to the surface. As a heavy carrier I make use of sand, barites, and silica and silicates (e.g., crushed aluminosilicates and feldspars). Suitable light-weight carriers include vermiculites (e.g., montmorillonite), and cellulosic materials, such as saw dust, agglomerated rice and other cereals. The latter form baits attractive to the mollusks and readily ingested thereby. The pesticide is selective and affects the mollusks without destruction of other aquatic life, normally used as source of human food, ingesting same.

The invention will become more readily apparent from the following examples:

Example I 25 kg. of hydrated copper sulfate are dissolved in 250 l. of water and an excess (about 30 kg.) of sodium bisulfite is added along with an equimolar amount of sodium carbonate. The solution changes from a bluish green to an orange color while carbon dioxide is evolved. A precipitate of a complex copper salt of copper sulfite settles from the solution. The solution is boiled to complete the reaction and permitted to stand after which the supernatant is decanted and the precipitate washed with water containing sodium sulfite. The precipitate may be partially dried under nitrogen into a paste which is active as a molluscicide for the treatment of waters infected with bilharziasis-carrying pests. Upon addition of the salt to a body of water in an amount equal to about 6 weight parts per million of the water (i.e., the equivalent of a cuprous oxide concentration of about $3 \times 10^{-3}$ grams per liter). The pesticide destroys substantially all of the mollusks in a period of 6–12 hours without toxically affecting fish or water fowl inhabiting the body of water. In fact, studies have shown that administration of this water internally to rabbits, pigeons and guinea pigs for a period of two months failed to show any toxic manifestations.

Example II

The paste obtained according to Example I was admixed with a lignosulfite in the proportion of about 1 part of the active salt to about 5 parts of the lignosulfite. The product was then dried and the resulting powder found to be stable indefinitely. The powder was employed as before in an amount of 1 kg. for each 300 metric tons of water: pond, cress bed, rice plantations, etc.

Example III

One part of the paste obtained in accordance with Example I was admixed to 0.5 part of cryptocresol dispersed in 5 parts of colloidal silica. The resulting product was introduced into about 400,000 parts of water.

Example IV

A product having parasiticidal properties was prepared by adding two weight percent of the product resulting from Example I to 48% by weight of a mixture of sand and chalk. 50% by weight of a bait substance attractive to the mollusks was also added. The bait consisted essentially of equal parts of bacon rind, yeast and flax seeds. One part of the resulting composition was added to about 8000 parts of water. About 0.6 gram of the active salt was found experimentally to disperse totally in 100 l. of water in 5–10 minutes, illustrating that the active substance is prepared to work almost immediately.

I claim:
1. A method of selectively destroying parasite-carrying mollusks in a body of mollusk-infested water, comprising the step of introducing into said body of water a suspension of cuprous oxide in a quantity between substantially 1 and 50 weight parts per million of the water.

2. A method of selectively destroying parasite-carrying mollusks in a body of water, comprising the step of introducing into said body of water a complex copper salt of copper sulfite, selected from the group which consists of Chevreul's salt, Pean's salt and Etard's salt, decomposable in said body of water to form a suspension of cuprous oxide, said salt being introduced in an amount ranging between substantially 1 and 50 weight parts per million of the water.

3. A method of selectively destroying parasite-carrying mollusks in a body of water, comprising the step of introducing into said body of water a complex copper salt selected from the group which consists of Chevreul's salt, Pean's salt and Etard's salt having the empirical formula $Cu[Cu_2(SO_3)_2(H_2O)_n]$, wherein $n$ is an integer ranging from 1 to 4 inclusively, decomposable in said body of water to form a suspension of cuprous oxide in said body of water.

4. A method of selectively destroying parasite-carrying mollusks in a body of water, comprising the step of introducing a parasiticidal preparation produced by admixing a reducing agent with a complex copper salt having the empirical formula $Cu[Cu_2(SO_3)_2(H_2O)_n]$, where $n$ is an integer between 1 and 4 inclusive, decomposable in said body of water to form a suspension of cuprous oxide therein, into said body of water.

5. A method of selectively destroying mollusks according to claim 4 wherein said preparation is admixed with a stabilizing substance prior to the introduction into said body of water.

6. A method according to claim 5 wherein said substance is a protein derivative.

7. A method according to claim 4 wherein said reducing agent is selected from the group which consists of sulfites, hydrosulfites, bisulfites, hydrazines, reducing sugars, oxalates, benzoates, gallates and dextrin.

8. A method according to claim 4 wherein said preparation is admixed with an oxidation-inhibiting substance.

9. A method according to claim 8 wherein said oxidation inhibiting substance is selected from the group which consists of glue and gelatine.

10. A method according to claim 4 wherein said preparation is admixed with a dispersing agent prior to the introduction into said body of water.

11. A composition for destroying parasite-carrying mollusks and dispersing in a body of water infested by said mollusks, said preparation comprising a complex copper salt of copper sulfite, selected from the group which consists of Chevreul's salt, Pean's salt and Etard's salt, decomposable in water to form a suspension of cuprous oxide, and a reducing agent admixed with said complex salt.

12. A composition according to claim 11 wherein said reducing agent is selected from the group which consists of sulfites, hydrosulfites, bisulfites, hydrazines, reducing sugars, benzoates, oxalates, gallates, and dextrin.

13. A composition for destroying mollusks carrying bilharziasis and schistosomiasis upon introduction into a body of water infested with said mollusks in an amount ranging between substantially 1 and 50 weight parts per million of the water, said composition comprising a complex copper salt having the empirical formula $Cu(Cu_2(SO_3)_2(H_2O)_n)$, where $n$ is an integer between 1 and 4 inclusive, and a reducing agent admixed with said copper salt.

14. A composition according to claim 13, further comprising a relatively dense material admixed with said salt for carrying same downwardly in said body of water to facilitate the destruction of mollusks inhabiting the bottom thereof.

15. A composition according to claim 13, further comprising a relatively light material admixed with said salt for supporting said salt in said body of water thereby facilitating the destruction of mollusks inhabiting upper regions thereof.

16. The composition according to claim 15 wherein said relatively light material has a density less than that of water and is adapted to float upon said body of water.

References Cited in the file of this patent

UNITED STATES PATENTS

| | | |
|---|---|---|
| 2,273,708 | Hurd | Feb. 17, 1942 |
| 2,280,168 | Stoddard | Apr. 21, 1942 |
| 2,789,936 | Davies | Apr. 23, 1957 |

FOREIGN PATENTS

| | | |
|---|---|---|
| 1,009,858 | France | June 4, 1952 |
| 489,222 | Great Britain | July 18, 1938 |